United States Patent [19]
Sekine

[11] Patent Number: 5,808,968
[45] Date of Patent: Sep. 15, 1998

[54] CAR OBSTACLE MONITORING SYSTEM

[75] Inventor: Takao Sekine, Tokyo, Japan

[73] Assignee: Niles Parts Co., Ltd., Tokyo, Japan

[21] Appl. No.: 672,931

[22] Filed: Jun. 28, 1996

[30] Foreign Application Priority Data

Oct. 20, 1995 [JP] Japan ................................. 7-297645

[51] Int. Cl.$^6$ .................................................. G01S 15/93
[52] U.S. Cl. ............................................ 367/99; 367/909
[58] Field of Search ........................... 367/909, 99, 105; 340/435, 436, 943

[56] References Cited

U.S. PATENT DOCUMENTS 4,658,385  4/1987  Tsuji ........................................ 367/909

FOREIGN PATENT DOCUMENTS

Sho 52-25641  12/1973  Japan .

Primary Examiner—Daniel T. Pihulic
Attorney, Agent, or Firm—Ronald P. Kananen

[57] ABSTRACT

A car obstacle monitoring system which will not erroneously detect a distant obstacle as an obstacle around a car and can avoid an erroneous detection by relatively simple control even though it is arranged so as to emit ultrasonic waves of a single frequency. A control circuit 12 controls a right sonar 1, a left sonar 4 and center sonars 2 and 3 provided on the right side, on the left side and at the center of a car 5, respectively. The control circuit 12 has a timing element and a discriminating element. The timing element generates three emission modes including a first emission mode in which the right sonar 1 and the sonar 3 emit ultrasonic waves in synchronism, a second emission mode in which the left sonar 4 and the center sonar 2 emit ultrasonic waves in synchronism, and a third emission mode in which the right sonar 1 and the left sonar 4 emit ultrasonic waves in synchronism repeatedly without overlapping each other. The discriminating element finalizes a discrimination that an obstacle has been detected when reflected waves are received consecutively by plural times in predetermined sampling times.

7 Claims, 3 Drawing Sheets

CAR OBSTACLE MONITORING SYSTEM

BACKGROUND OF THE INVENTION

1. Field of the Invention

The present invention relates generally to monitoring systems and, in particular, to a car obstacle monitoring system for detecting an obstacle around a car from reflected waves of ultrasonic waves emitted around the car from a right sonar provided on the right side of the car, a left sonar provided on the left side of the car, and center sonars provided at the center of the car.

2. Description of the Prior Art

Conventional monitoring systems are known for detecting obstacles around a car by mounting sonars on the car and by emitting ultrasonic wave pulses from the sonars. Generally, a car obstacle monitoring system of this sort emits ultrasonic wave pulses of a single frequency intermittently at a constant period and gives an alarm to a driver that there exists an obstacle when it detects a reflected wave within a sampling timing set after a predetermined time from the emission timing. However, such a car obstacle monitoring system often detects erroneously as if there exists an obstacle in the vicinity of the car when it detects a reflected wave from a distant obstacle within a sampling time in the next cycle.

In order to deal with such erroneous operation, Japanese Patent Publication No. 52-25641, for example, has disclosed a system comprising transmitters for alternately emitting ultrasonic waves having different frequencies, receivers for receiving the ultrasonic waves reflected by an object to be detected, and an ultrasonic detecting switch arranged so as to operate when it receives reflected signals caused by the ultrasonic waves having different frequencies continuously and alternately.

However, the prior art car obstacle monitoring system described above has had problems in that it requires a plurality of oscillation circuits because ultrasonic waves having different frequencies have to be emitted. Moreover, the sonar of the prior art system may be excited at a point other than a resonant point when one type of sonar is excited with a plurality of different frequencies, thus dropping an efficiency for emitting ultrasonic waves.

SUMMARY OF THE INVENTION

It is an object of the present invention to solve the aforementioned problems associated with conventional car obstacle monitoring systems.

Specifically, it is an object of the present invention to provide a car obstacle monitoring system that will not erroneously detect a distant obstacle as an obstacle around the car and can avoid an erroneous detection by relatively simple control even though the monitoring system is arranged so as to emit ultrasonic waves of a single frequency.

Additional objects, advantages and novel features of the invention will be set forth in part in the description that follows, and in part will become apparent to those skilled in the art upon examination of the following or may be learned by practice of the invention. The objects and advantages of the invention may be realized and attained by means of the instrumentalities and combinations particularly pointed out in the appended claims.

In order to achieve the aforementioned objects, according to one aspect of the present invention, there is provided a car obstacle monitoring system comprising a right sonar provided at a right side of a car, a left sonar provided at a left side of the car, and center sonars provided at a center of the car for emitting ultrasonic waves around the car to detect an obstacle around the car from reflected waves thereof. The monitoring system is equipped with a control circuit having a timing element for generating three emission modes including a first emission mode in which the right sonar and the center sonar emit ultrasonic waves in synchronism, a second emission mode in which the left sonar and the center sonar emit ultrasonic waves in synchronism, and a third emission mode in which the right sonar and the left sonar emit ultrasonic waves in synchronism. The three emission modes are generated repeatedly without overlapping each other. A discriminating element is provided in the control circuit for finalizing a discrimination that an obstacle has been detected when reflected waves are received consecutively by plural times in predetermined sampling times.

Further, according to another aspect of the present invention, there is provided the car obstacle monitoring system in which the control circuit has the timing element for generating each emission mode by fluctuating a required time from one emission mode to the next emission mode from 20 to 30 mSEC.

BRIEF DESCRIPTION OF THE DRAWINGS

The present invention will become more clearly appreciated as the disclosure of the present invention is made with reference to the accompanying drawings. In the drawings.

DETAILED DESCRIPTION OF THE PREFERRED EMBODIMENT

A preferred embodiment of the present invention will be explained below with reference to the drawings.

Figure 1:
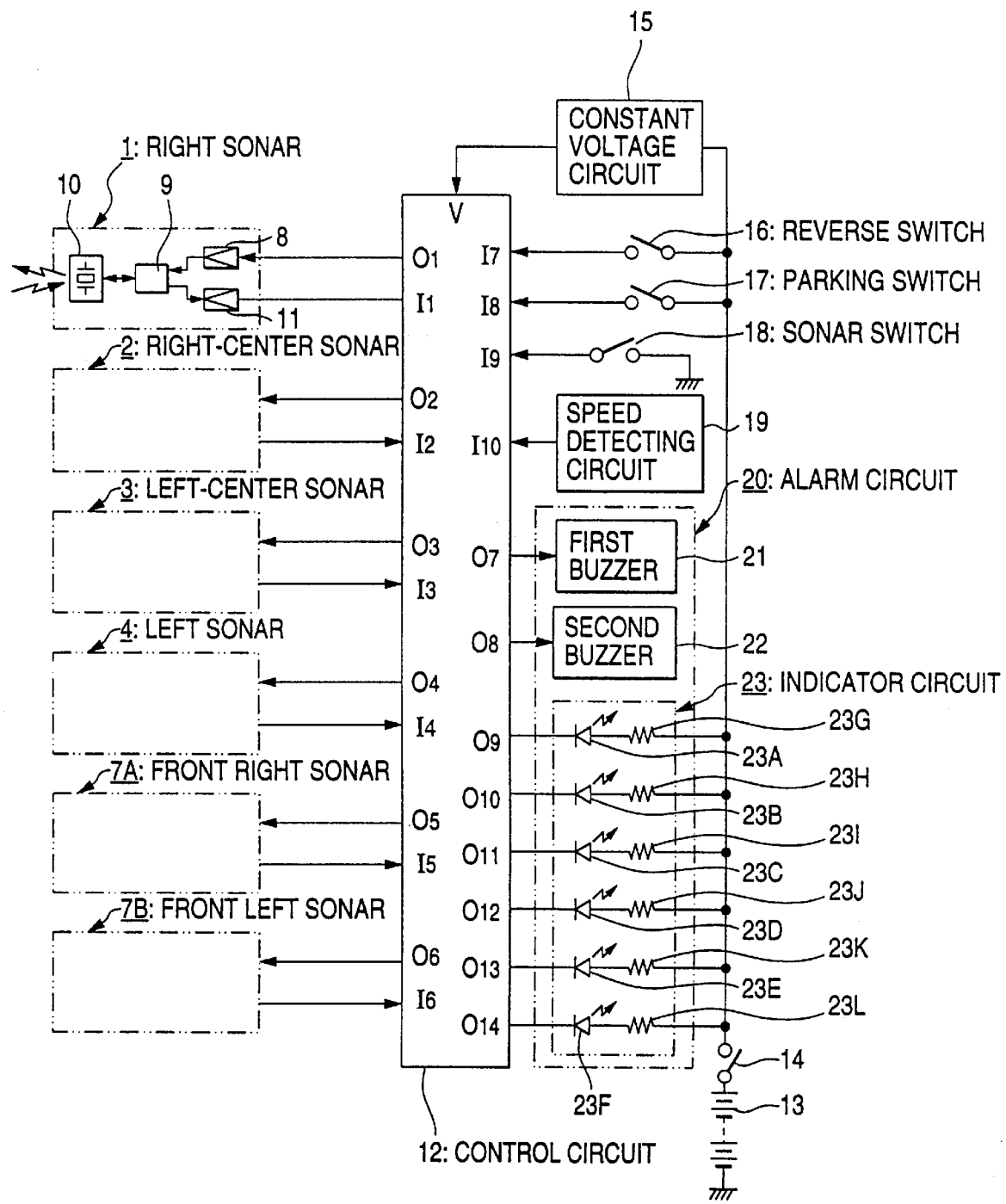
FIG. 1 is an electrical circuit diagram illustrating a preferred embodiment of the present invention.
Figure 2:
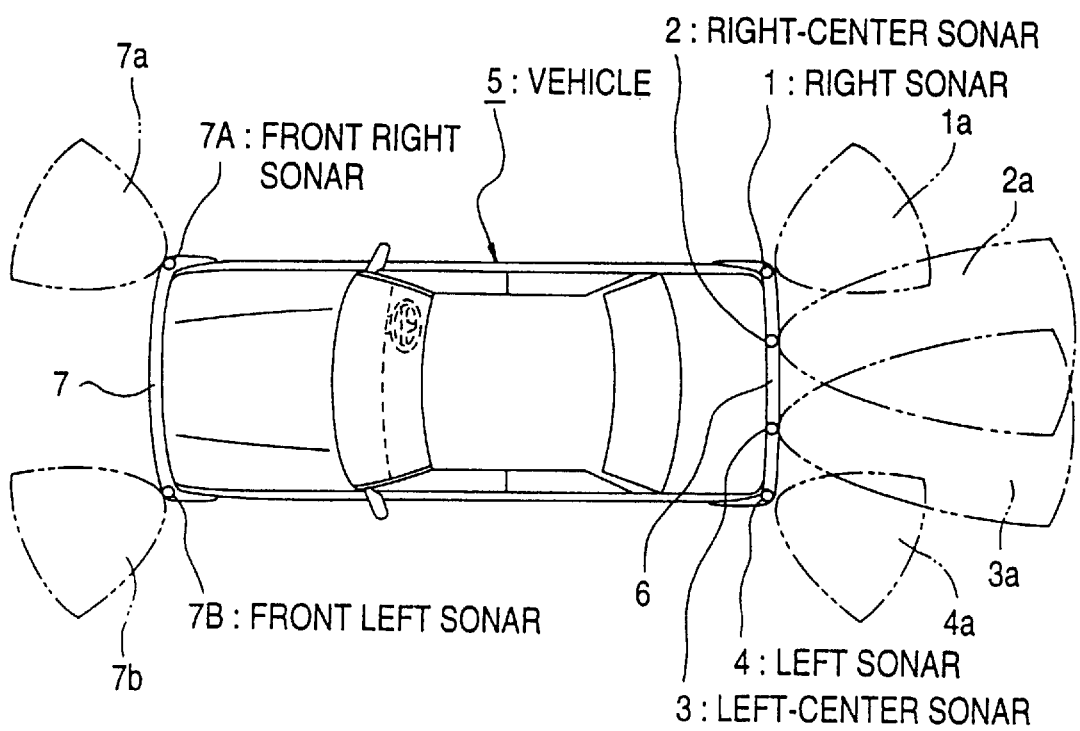
FIG. 2 is a top view of a car mounting a system shown in FIG. 1.

FIG. 1 is an electrical circuit diagram of a car obstacle monitoring system according to the preferred embodiment of the present invention. As shown in FIG. 2, a right sonar 1, a right-center sonar 2, a left-center sonar 3 and a left sonar 4 are mounted to a rear bumper 6 of a car 5. A front-right sonar 7A and a front-left sonar 7B are mounted to a front bumper 7 of the car 5. The sonars 1 to 7B are also shown in the circuit diagram of FIG. 1.

The system further comprises a control circuit 12, a DC power source 13, an ignition switch 14, a constant voltage circuit 15, a reverse switch 16, a parking switch 17, a sonar switch 18, a speed detecting circuit 19, an alarm circuit 20, buzzers 21 and 22, and an indicator circuit 23. A structure of each of these components will be explained below.

The right sonar 1 comprises an input amplifier circuit 8, a transmission/receiving switching circuit 9, an ultrasonic oscillator 10 and an output amplifier circuit 11. The right-center sonar 2, the left-center sonar 3, the left sonar 4, the front right sonar 7A and the front left sonar 7B also have the same structure as the right sonar 1 and an explanation thereof will therefore be omitted here.

As shown in FIG. 2, the right sonar 1 is provided at the right corner of the rear bumper 6 of the car 5 and has a detecting area 1a. The right-center sonar 2 is provided at the right of center of the rear bumper 6 and has a detecting area 2a. The left-center sonar 3 is provided at the left of center of the rear bumper 6 and has a detecting area 3a. The left sonar 4 is provided at the left corner of the rear bumper 6 and has a detecting area 4a. The front right sonar 7A is provided at the right corner of the front bumper 7 and has a detecting area 7a. The front left sonar 7B is provided at the left corner of the front bumper 7 and has a detecting area 7b.

The input amplifier circuit 8 amplifies an electrical signal input from the control circuit 12 described later and outputs it to the ultrasonic oscillator 10 via the transmission/receiving switching circuit 9.

The ultrasonic oscillator 10 has a function of a speaker for converting the electrical signal into mechanical vibration and emitting it as ultrasonic waves as well as a function of a microphone for receiving reflected waves of the ultrasonic waves emitted by the ultrasonic oscillator 10 to convert them into an electrical signal.

The output amplifier circuit 11 receives the detection signal received by the ultrasonic oscillator 10 via the transmission/receiving switching circuit 9 and amplifies and outputs it to the control circuit 12.

The reverse switch 16 and the parking switch 17 are turned on when a shift change lever (not shown) is shifted to Reverse or Park, respectively.

The sonar switch 18 allows a driver to switch an operation of each of the sonars 1 through 7B manually and arbitrarily.

The alarm circuit 20 comprises the first and second buzzers 21 and 22 and the indicator circuit 23. The indicator circuit 23 comprises light emitting diodes 23A through 23F and resistors 23G through 23L provided in correspondence with each of the sonars 1 through 7B.

The control circuit 12 is constructed by a microcomputer and has a function of operating each of the sonars 1 through 7B in a predetermined control mode based on each input signal of the reverse switch 16, the parking switch 17, the sonar switch 18 and the speed detecting circuit 19 input from input ends $I_7$ through $I_{10}$, and a function of operating the alarm circuit 20 based on the received signal when each of the sonars 1 through 7B receives the reflected waves.

The control circuit 12 will be explained below in detail.

The control circuit 12 has a timing element and a discriminating element in a form of a program (not shown).

The timing element generates three emission modes of a first emission mode in which the right sonar 1 and the left-center sonar 3 emit ultrasonic waves in synchronism, a second emission mode in which the left sonar 4 and the right-center sonar 2 emit ultrasonic waves in synchronism and a third emission mode in which the right sonar 1 and the left sonar 4 emit ultrasonic waves in synchronism. The timing element generates the three emission modes repeatedly without overlapping each other. The timing element generates each emission mode by fluctuating a required time from one emission mode to a next emission mode from 20 to 30 mSEC.

Figure 3:
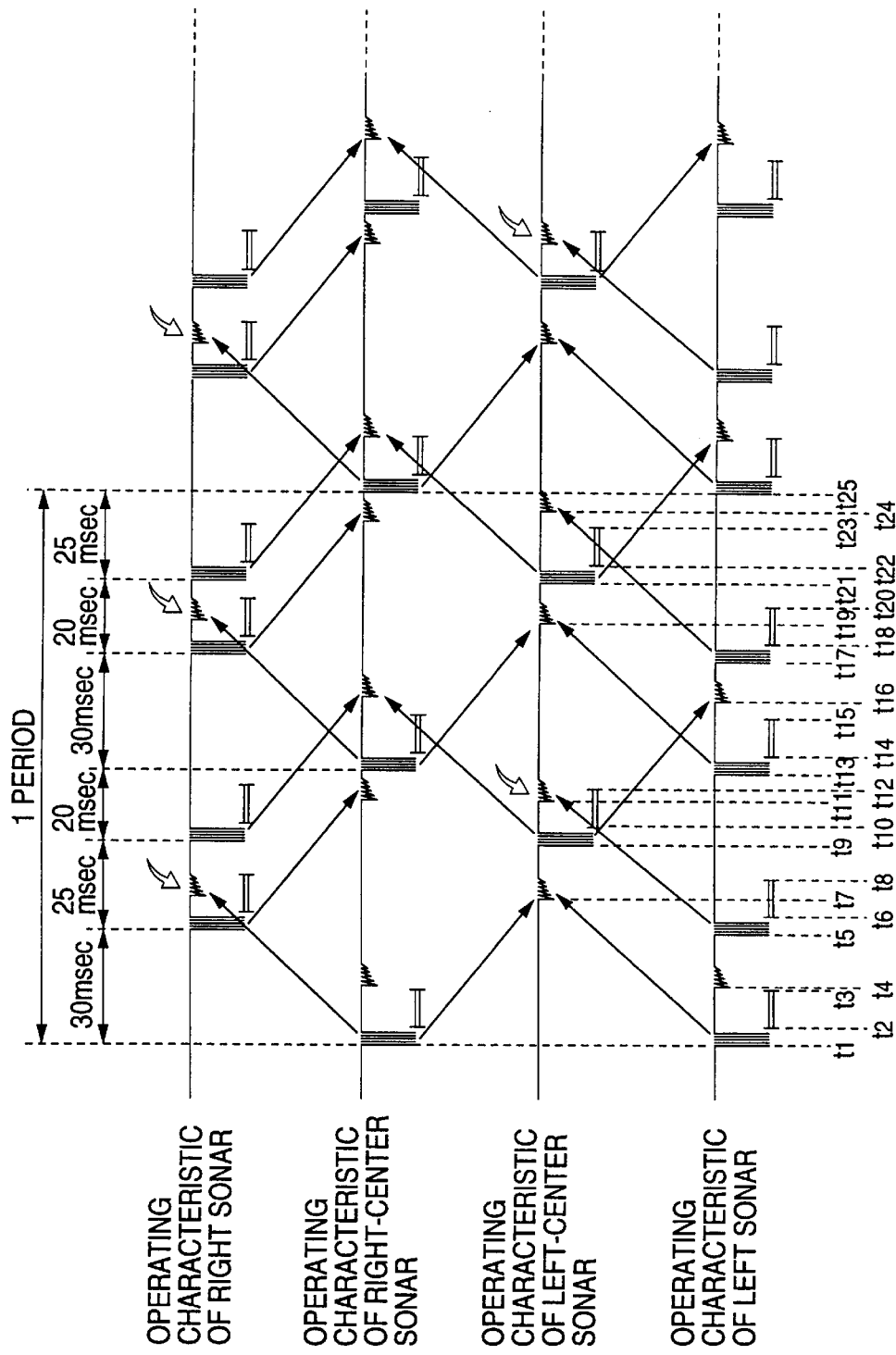
FIG. 3 is a time chart showing characteristics of the system shown in FIG. 1.

For example, as shown in a time chart in FIG. 3, the timing element generates the second emission mode in which the left sonar 4 and the right-center sonar 2 emit ultrasonic waves in synchronism at times t1 and t13, the third emission mode in which the left sonar 4 and the right sonar 1 emit ultrasonic waves in synchronism at times t5 and t17, and the first emission mode in which the right sonar 1 and the left-center sonar 3 emit ultrasonic waves in synchronism at times t9 and t21.

Then, a required time from the second emission mode at times t1 and t13 to the third emission mode at times t5 and t17 is set respectively at 30 mSEC.

A required time from the third emission mode at time t5 to the first emission mode at time t9 and that from the first emission mode at time t21 to the second emission mode in the next cycle at time t25 are set respectively at 25 mSEC.

Further, a required time from the first emission mode at time t9 to the second emission mode at time t13 and that from the third emission mode at time t17 to the first emission mode at time t21 are set respectively at 20 mSEC.

Thus, the required time between each emission mode is fluctuated from 20 to 30 mSEC.

It is noted that the front right sonar 7A is arranged to emit ultrasonic waves in synchronism with the left sonar 4 and the front left sonar 7B to emit ultrasonic waves in synchronism with the right sonar 1.

The discriminating element of the control circuit 12 finalizes a discrimination that an obstacle has been detected when reflected waves are received consecutively by plural times in predetermined sampling times.

For example, as shown in the time chart in FIG. 3, times between t6 and t8, between t10 and t12, between t18 and t20, and between t22 and t23 after when the right sonar 1 has emitted ultrasonic waves are set as sampling times. Even if a reflected wave is detected during the sampling time, the element is arranged so as not to finalize the discrimination that an obstacle has been detected until the reflected waves are received consecutively more than three times. Accordingly, even if a reflected wave of the ultrasonic waves emitted by the right-center sonar 2 is erroneously received at times t7 and t19, no obstacle is detected because the reflected waves are not received consecutively more than three times during the sampling times of the right sonar 1.

In the same manner, times between t2 and t4, and between t14 and t15 are set as sampling times for the right-center sonar 2, times between t10 and t12 and between t22 and t23 are set as sampling times for the left-center sonar 3, and times between t2 and t4, between t6 and t8, between t14 and t15 and between t18 and t20 are set as sampling times for the left sonar 4. Unless reflected waves are received consecutively more than three times during each sampling time of the right-center sonar 2, the left-center sonar 3 and the left sonar 4, no obstacle is detected.

An operation of the embodiment will be explained below by using the time chart in FIG. 3. It is noted that a horizontal axis in FIG. 3 indicates time and a vertical axis indicates signal waveform measured at a terminal of the ultrasonic oscillator 10 of each sonar 1 through 4.

The control circuit 12 controls each sonar 1 through 4 when the input signals from the reverse switch 16, the parking switch 17, the sonar switch 18 and the speed detecting circuit 19 meet predetermined conditions. Each sonar 1 through 4 emits ultrasonic waves repeatedly within a period of 150 mSEC in the first, second and third emission modes described above. Such operation will be explained concretely by the time chart in FIG. 3.

At time t1 at first, the left sonar 4 and the right-center sonar 2 emit ultrasonic waves in the second emission mode. Following that, the transmission/receiving switching circuits 9 of the left sonar 4 and the right-center sonar 2 are switched to the receiving side in the sampling time between t2 and t3 to put the left sonar 4 and the right-center sonar 2 into a state wherein they can receive reflected waves.

Then, while the left sonar 4 and the right-center sonar 2 receive the reflected waves of the ultrasonic waves emitted previously by the right sonar 1 and the left-center sonar 3, they are processed supposing that neither of the left sonar 4 and the right-center sonar 2 have received the reflected wave in this case because the reflected waves have been received after the above-mentioned sampling time.

Next, at time t5 the right sonar 1 and the left sonar 4 emit ultrasonic waves in the third emission mode. Following that, the transmission/receiving switching circuit 9 of the right sonar 1 and the left sonar 4 is switched to the receiving side so as to be able to receive reflected waves in the sampling time between t6 and t8 in the same manner.

At this time, the right sonar 1 receives a reflected wave of the ultrasonic waves emitted previously by the right-center sonar 2 at time t7 during the sampling time and the reflected wave is processed supposing that only the right sonar 1 has received the reflected wave in this case.

Next at time t9, the right sonar 1 and the left-center sonar 3 emit ultrasonic waves in the first emission mode. Following that, the transmission/receiving circuit 9 of the right sonar 1 and the left-center sonar 3 is switched to the receiving side to be able to receive reflected waves in the sampling time between t10 and t12 in the same manner.

At this time, the left-center sonar 3 receives the reflected wave of the ultrasonic waves emitted previously by the left sonar 4 during time t11 during the sampling time and the reflected wave is processed supposing that only the left-center sonar 3 has received the reflected wave in this case.

In the same manner, the left sonar 4 and the right-center sonar 2 emit ultrasonic waves in the second emission mode at time t13, the right sonar 1 and the left sonar 4 emit ultrasonic waves in the third emission mode at time t17 and the right sonar 1 and the left-center sonar 3 emit ultrasonic waves in the first emission mode at time t21.

Then, the transmission/receiving switching circuit 9 of each sonar 1 through 4 is switched to the receiving side to be able to receive reflected waves in each sampling time between t14 and t15, between t18 and t20 and between t22 and t23.

Each sonar 1 through 4 is controlled by defining the above-mentioned times t1 through t25 as one period. It is noted that although the right sonar 1 receives the reflected waves at time t7 and t19 and the left-center sonar 3 receives the reflected wave at time t11, respectively, in the case of the embodiment shown in FIG. 3, it is assumed that no obstacle has been detected because they have not received the reflected waves consecutively more than three times. That is, in the case of the embodiment shown in FIG. 3, the control circuit 12 will not activate the alarm circuit 20.

Thus, according to the present invention, even if the required time from one emission mode to the next emission mode is set short from 20 to 30 mSEC, the control circuit 12 will not erroneously activate the alarm circuit 20 and an obstacle approaching to the car can be detected accurately and quickly.

Because the present invention has the structure and operation described above, it will not erroneously detect a distant obstacle as an obstacle around the car even though the system is arranged to emit ultrasonic waves of a single frequency and can avoid erroneous detection by relatively simple control.

While a preferred embodiment has been described, variations thereto will occur to those skilled in the art within the scope and spirit of the present invention, the inventive concepts which are delineated by the appended claims.

What is claimed is:

1. A car obstacle monitoring system comprising:

a right sonar provided at a right side of a car, a left sonar provided at a left side of the car, and at least a pair of center sonars provided at a center of the car, said right, left, and center sonars being provided for emitting ultrasonic waves around said car to detect an obstacle around said car from reflected waves thereof;

said car obstacle monitoring system further comprising a control circuit having a timing element for generating three emission modes including a first emission mode in which said right sonar and said center sonar emit ultrasonic waves in synchronism, a second emission mode in which said left sonar and said center sonar emit ultrasonic waves in synchronism, and a third emission mode in which said right sonar and said left sonar emit ultrasonic waves in synchronism, said emission modes being generated repeatedly without overlapping each other, and a discriminating element for finalizing a discrimination that an obstacle has been detected when reflected waves are received consecutively by plural times in predetermined sampling times, wherein said timing element generates each emission mode by fluctuating a required time from one emission mode to the next emission mode from 20 to 30 MSEC.

2. A monitoring system for detecting obstacles near a car, comprising:

a first sonar provided on a first side of the car;

a fourth sonar provided on a second side of the car;

second and third sonars provided on the car between said first and fourth sonars;

said sonars being adapted to emit and receive ultrasonic waves around the car to detect obstacles near the car; and a control circuit having a timing element for generating three emission modes including a first emission mode in which said first sonar and said third sonar emit ultrasonic waves in synchronism, a second emission mode in which said second sonar and said fourth sonar emit ultrasonic waves in synchronism, and a third emission mode in which said first sonar and said fourth sonar emit ultrasonic waves in synchronism, said emission modes being generated repeatedly without overlapping each other, wherein said control circuit places said first and third sonars into a receiving mode for a predetermined sampling time following said first emission mode, said second and fourth sonars into a receiving mode for a predetermined sampling time following said second emission mode, and said first and fourth sonar into a receiving mode for a predetermined sampling time following said third emission mode.

3. The monitoring system according to claim 2, wherein said control circuit comprises discriminating means for finalizing a discrimination that an obstacle has been detected near the car when reflected waves are received by at least one of said sonars in each of a plurality of consecutive sampling times.

4. The monitoring system according to claim 3, wherein said plurality of consecutive sampling times is three consecutive sampling times.

5. A monitoring system for detecting obstacles near a car, comprising:

a first sonar provided on a first side of the car:

a fourth sonar provided on a second side of the car;

second and third sonars provided on the car between said first and fourth sonars;

said sonars being adapted to emit and receive ultrasonic waves around the car to detect obstacles near the car; and a control circuit having a timing element for generating three emission modes including a first emission mode in which said first sonar and said third sonar emit ultrasonic waves in synchronism, a second emission mode in which said second sonar and said fourth sonar emit ultrasonic waves in synchronism, and a third emission mode in which said first sonar and said fourth sonar emit ultrasonic waves in synchronism, said emission modes being generated repeatedly without overlapping each other, wherein said timing element generates each emission mode by fluctuating a required time from one emission mode to the next emission mode from 20 to 30 MSEC.

6. The monitoring system according to claim 3, wherein said timing element generates each emission mode by fluctuating a required time from one emission mode to the next emission mode from 20 to 30 mSEC.

7. The monitoring system according to claim 6, wherein said predetermined sampling times are shorter than the fluctuating time from one emission mode to the next emission mode.

* * * * *